Nov. 25, 1941.  E. C. HORTON  2,264,241
WINDSHIELD CLEANER
Filed April 20, 1939  2 Sheets-Sheet 1
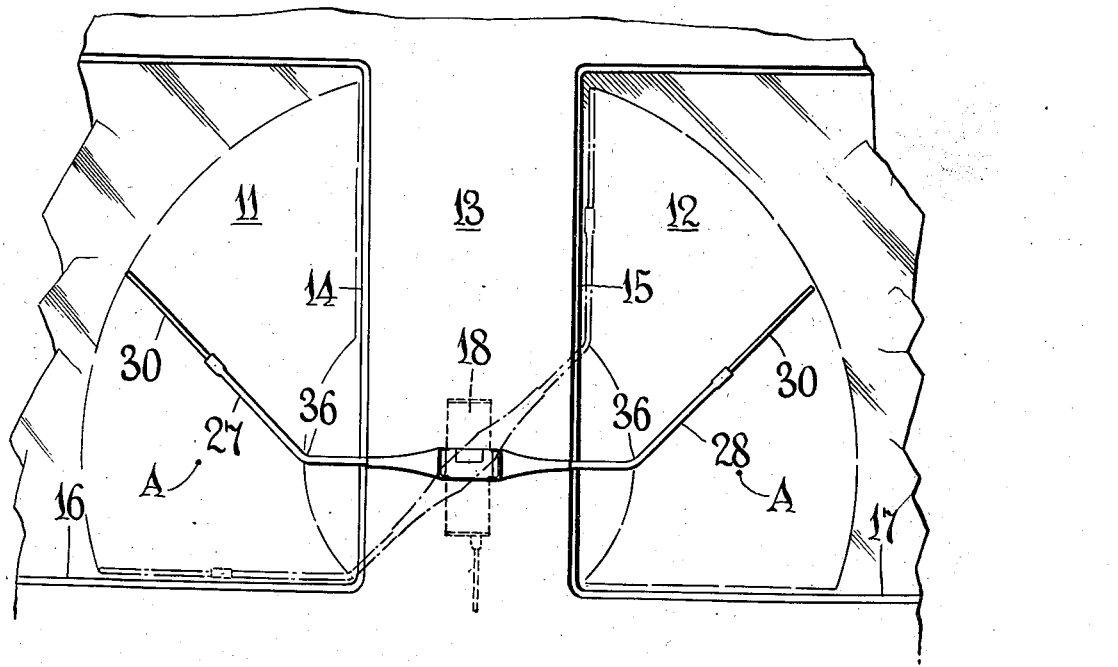
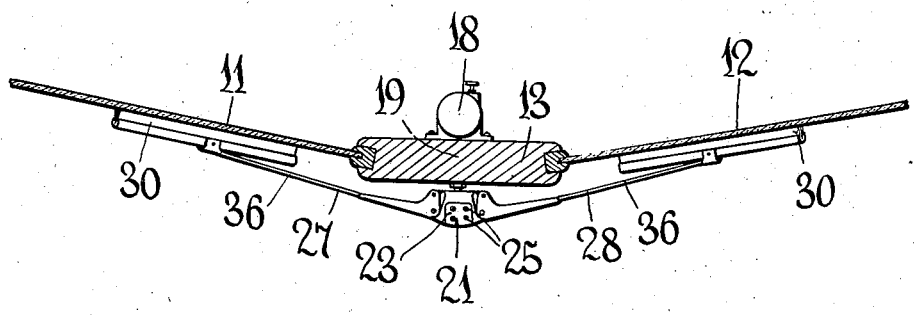
INVENTOR
Erwin C. Horton,
BY
Bean, Brooks, Buckley & Bean,
ATTORNEYS Nov. 25, 1941.　　　　E. C. HORTON　　　　2,264,241
WINDSHIELD CLEANER
Filed April 20, 1939　　　　2 Sheets-Sheet 2
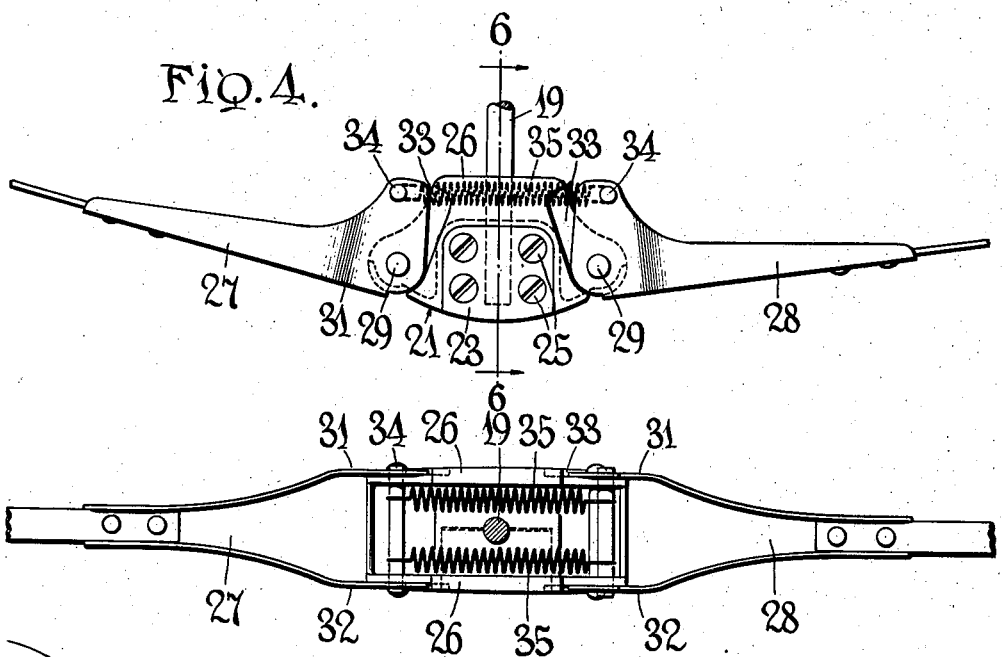
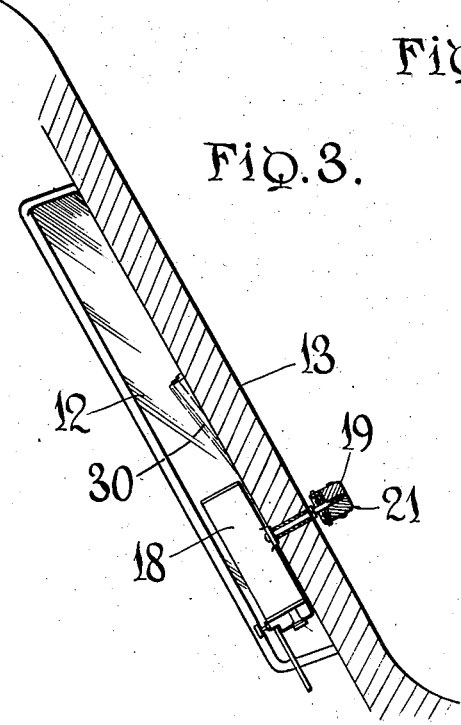
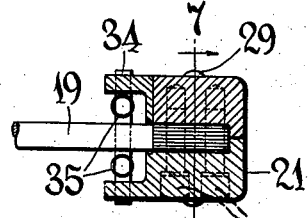
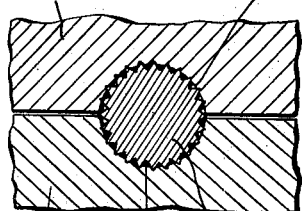
INVENTOR
Erwin C. Horton,
BY
Beau, Brooks, Buckley & Beau.
ATTORNEYS Patented Nov. 25, 1941

2,264,241

UNITED STATES PATENT OFFICE 2,264,241

WINDSHIELD CLEANER

Erwin C. Horton, Hamburg, N. Y., assignor to Trico Products Corporation, Buffalo, N. Y.

Application April 20, 1939, Serial No. 268,969

8 Claims. (Cl. 15—255)

The present invention relates to a motor vehicle construction including a windshield cleaner mechanism, and has particular relation to such constructions wherein a plurality of wiper blades and their supporting and operating parts are employed.

In windshield cleaner mechanisms of the oscillating type, wherein the blade or blades move in an arcuate path over the windshield surface or surfaces, a separate rock shaft or supporting shaft is usually provided for each blade, and in instances where a single motor serves to move a plurality of such blades there has been provided various types of linkages for transferring the motion. Such linkage is usually complex, requiring a number of moving parts and bearings therefor, particularly in cases where plural blades operate upon different surfaces which are angularly related.

The present invention provides a simplified arrangement whereby plural wipers may be directly connected by wiper arms to a single motor or rock shaft, the motion of such shaft being transmitted by parts moving bodily with it, without the aid of gears, bell cranks, pivoted links, or similar motion transferring devices such as heretofore have been employed.

The mechanism of the present invention is so arranged that pressure of the wipers upon the windshield surfaces may be substantially uniform during operation, despite that such surfaces may be related angularly to each other and both of them be disposed in non-normal relation to the axis of the rock shaft.

These and other objects and advantages, including those relating to novel arrangements and formations of the several parts, will become apparent from the following description of one typical embodiment of the invention, the same being illustrated in the accompanying drawings, wherein:

Fig. 1 is a front elevation of a motor vehicle windshield construction to which the invention has been applied;

Fig. 2 is a substantially horizontal sectional view through the construction shown in Fig. 1;

Fig. 3 is a vertical sectional view taken centrally of said construction;

Figs. 4 and 5 are respectively plan and rear elevational views showing the improved means for connecting the wiper arms to the rock shaft;

Fig. 6 is a sectional view taken along line 6—6 of Fig. 4; and,

Fig. 7 is an enlarged fragmentary sectional view taken along line 7—7 of Fig. 6.

As shown in Figs. 1 to 3 inclusive, the motor vehicle, in this instance, a bus, has a pair of glass windshield sections 11 and 12 separated by frontal member 13. The glass sections have adjacent substantially vertical edges 14 and 15, respectively, and lower substantially horizontal edges 16 and 17, and the sections are angularly related to each other and to the frontal member 13, inclining forwardly toward the latter and also inclining forwardly from top to bottom.

The illustrated windshield cleaner mechanism includes a motor 18 mounted on frontal member 13 and having a forwardly projecting shaft 19 which it oscillates angularly about the axis of the shaft during operation. Secured to the shaft is a wiper arm head 21, having a semi-cylindrical shaft receiving recess 22, a cap 23 with a similar shaft receiving recess 24 being clamped to the head 21 by threaded fasteners 25.

The end of the shaft has a serrated surface, and the recesses 22 and 24 are initially formed somewhat smaller in radius than the shaft radius, so that the clamping means 25 may be applied to cause the serrations on the shaft to bite into the metal of the parts 21 and 23, providing a firm interlock. The last mentioned parts are preferably die-cast, the metal thereof being soft enough as to be deformable to substantially complement the serrations.

The wiper arm head has rearwardly and laterally extending upper and lower flanges 26 to which wiper arms 27 and 28 are pivoted by pins 29, the axes of the pins being parallel to each other, spaced laterally from and being in a plane normal to the axis of oscillation of shaft 19, and also being normal to the flanges 26.

The wiper arms may be of any suitable construction, carrying at their outer ends wiper blades 30, and their inner ends being of generally channeled formation with upper and lower flanges 31 and 32 respectively above and below the upper and lower flanges 26. The latter are recessed, as indicated at 33, in order that their exposed surfaces may be flush with the adjacent parts of flanges 31 and 32.

Connecting flanges 31 and 32 on each arm at a point rearward of the pivot pin 29, is a pin 34. Springs 35, one between shaft 19 and the upper flange 26 and the other between the shaft and lower flange 26, connect pins 34, urging relative movement of arms 27 and 28 about their pivot axes (the axes of pins 29) in such direction that blades 30 are pressed against the window surfaces.

The wiper arms 27 and 28 are bent, as indicated at 36, in order that so much of the arms as overlies the blades will be parallel therewith, and so that when in their lowermost positions blades 30 may be substantially parallel and lie adjacent window edges 16 and 17 and in their uppermost positions, substantially parallel and lie adjacent window edges 14 and 15.

In operation the rock shaft 19 is oscillated by the motor, arm 27 descending as arm 28 ascends, and vice versa, between limit positions wherein the blades carried by the arms parallel the window edges, as above described.

As one of the wiper arms rises from its lowermost position the included angle between it and shaft 19 very slightly increases until the point of connection between the arm and blade reaches a point approximately located at A on Fig. 1, after which the angle gradually decreases as the arm ascends until the arm's uppermost position is reached, this effect resulting from the nonnormal relationship of the shaft to the window surfaces. The angular movement between the shaft and arms is relatively large between point A and the uppermost position of the arms; substantially negligible between point A and the lowermost position of the arms.

The structure of this invention compensates for the angular motion between the shaft and arms since, in general, the angle of the shaft to one arm decreases as the other increases, and vice versa, and springs 26 shift laterally as such changes occur, but at all times exert a substantially uniform pressure on the wiper arms for pressing the blades against the window surfaces.

In other words, the springs 35 constitute a differential connection between the opposed arms 27 and 28 which alternately recede and advance relative to a plane normal to shaft 19 as they ascend and descend, the differential connection compensating for such recession and advancement and maintaining substantially uniform wiping pressure on the arms.

It will be understood that the structure herein shown and described is merely illustrative of the several inventive principles involved, and that these same principles may be otherwise embodied without departing from the spirit of the invention or the scope of the appended claims.

I claim:

1. In a vehicle construction, a pair of angularly related windows, a wiper shaft disposed between said windows, an arm head on said shaft adapted for angular oscillation about the longitudinal axis of said shaft, substantially opposed arms carrying wipers and pivoted to said arm head, each of said wipers overlying one of said windows, and spring means connecting said arms and reacting between them for urging the wipers toward the respective adjacent windows to maintain substantially uniform wiping contact thereon.

2. In a vehicle construction, a pair of angularly related windows, a wiper shaft disposed between said windows, means for rocking said shaft about its longitudinal axis, an arm carrying a wiper extending over each of said windows and means pivoting said arms to said shaft for movement toward or away from the windows, and resilient means connecting said arms and reacting between them for urging the wipers toward the windows to maintain substantially uniform wiping contact thereon.

3. In a vehicle construction, a wiper shaft, window surfaces on opposite sides of the shaft, the longitudinal axis of the shaft being in nonnormal relation to said window surfaces, a pair of wiper arms extending substantially oppositely from the shaft, each arm carrying a wiper overlying one of said window surfaces and being pivoted to the shaft for movement toward or away from said surface, and spring means connecting said arms and reacting between them for urging relative movement of the wipers to urge them toward said window surfaces to maintain substantially uniform wiping contact thereon.

4. In a vehicle construction, a pair of angularly related adjacent windows having substantially vertical adjacent edges and substantially horizontal edges adjoining said vertical edges, a wiper shaft mounted between said windows and having arms extending therefrom in substantially opposite directions, one arm overlying one window and the other arm overlying the other window, and wiper blades carried by said arms for movement upon the respective windows upon angular oscillation of said shaft, said blades being movable thereby between a position adjacent one of said substantially horizontal edges and a position adjacent said substantially vertical edge, one of said blades being adjacent said substantially vertical edge of one window when the other blade is adjacent said substantially horizontal edge of the other window, and spring means reacting between said arms for urging the wipers toward said windows to maintain substantially uniform wiping contact thereon.

5. In a vehicle construction, a pair of angularly related windows having adjacent substantially vertical edges and substantially horizontal edges, an arm carrying a wiper for each window and mounted for movement about an axis passing between said windows in a path approximately between said substantially vertical edge and said substantially horizontal edge, means connecting said arms in substantially opposed relation whereby one arm is in its upper position when the other is in its lower position, and spring means reacting between said arms for urging the wipers toward said windows to maintain substantially uniform wiping contact thereon.

6. In a windshield cleaner, a rock shaft, a cross head secured thereto, a pair of wiper arms pivoted to said cross head on opposite sides of said shaft, the pivot axis of each arm being in a plane substantially normal to the axis of said rock shaft, and a spring connecting and reacting directly and entirely between portions of said arms eccentric of the pivot of each arm for urging relative movement of said arms about their pivots, said spring being capable of bodily shifting upon angular movement of the arms in the same direction about their pivots to the cross head.

7. In a windshield cleaner, a rock shaft extending forwardly of an adjacent windshield surface, a member secured to said shaft having rearwardly extending flanges above and below said shaft, wiper arms pivoted to said flanges on opposite sides of said shaft, the pivot axes being substantially normal to the planes of said flanges, and a pair of coil springs each connecting said arms for urging them rearwardly about their respective pivot axes, one of said springs located between the upper flange and said shaft, and the other of said springs located between the lower flange and said shaft.

8. In a vehicle construction having a pair of angularly related windows, a wiper shaft disposed between said windows, means for rocking said shaft about its longitudinal axis, a wiper arm extending over each of said windows, and wipers on said arms in contact with the windows whereby one arm will advance and the other recede with respect to a plane normal to the axis of said shaft as the shaft is rocked, and resilient means reacting between said arms for maintaining uniform wiping pressure on said wipers during such receding and advancing movement.

ERWIN C. HORTON.